United States Patent [19]

Fletcher

[11] 3,995,890
[45] Dec. 7, 1976

[54] CONVERTIBLE STRUCTURE

[76] Inventor: Robert L. Fletcher, 623 S. 9th St., Beatrice, Nebr. 68310

[22] Filed: July 7, 1975

[21] Appl. No.: 593,362

[52] U.S. Cl. ................................ 296/10; 49/340; 296/100; 296/137 B
[51] Int. Cl.² ........................................ B60P 3/42
[58] Field of Search ................ 296/137 R, 100, 10, 296/137 B; 49/329, 339, 340

[56] References Cited
UNITED STATES PATENTS

| | | | |
|---|---|---|---|
| 1,965,452 | 7/1934 | Brown | 296/137 R |
| 3,069,199 | 12/1962 | Reardon | 296/100 |
| 3,464,161 | 9/1969 | Jonsson | 49/203 X |
| 3,858,744 | 1/1975 | Garvert | 296/100 X |
| 3,861,737 | 1/1975 | Kirkbride | 296/100 |
| 3,941,415 | 3/1976 | Cooper | 296/137 B X |

*Primary Examiner*—Robert R. Song
*Assistant Examiner*—Michael J. Forman
*Attorney, Agent, or Firm*—Henderson, Strom & Sturm

[57] ABSTRACT

A structure having a movable roof formed in two sections which sections are pivotally secured to the side walls by hinge elements and to the front and rear walls by control arms, wherein the roof panels are pivotal from a closed, horizontal position to an open vertical position disposed alongside the side walls.

7 Claims, 5 Drawing Figures

CONVERTIBLE STRUCTURE

BACKGROUND OF THE INVENTION

Many people wish to utilize their pickup truck as a recreational vehicle without losing the primary use of the truck as a large cargo hauling vehicle. Traditionally, the camper is fixed to the bed of the pickup. If the person would wish to utilize the cargo area of the truck, the camper would have to be removed. The solution to this dilemma was to have a camper that could be converted to an open topped structure thereby permitting the use of the truck as a recreational vehicle or as a cargo hauling vehicle.

There are many types of convertible vehicles as disclosed by the prior art, the most recent being the accordion-type of longitudinally collapsible canopy type coverings. In order to have the opened top, the whole unit must be slid towards the cab which in turn occupies valuable space in the cargo area. Furthermore, the canopy type of structures do not afford the rigidity as would a metal structure, neither the permanence nor the aesthetic appeal as would a metal structure. In fact, canvas coverings do wear out faster than metal skin, or a wooden skin structure.

A rigid camper frame provides a method to provide for insulation which greatly enhances the use of a recreational vehicle in all types of weather and seasons. Such cannot be the case with a canopy covering of the accordion-type due to the bulkiness of the insulation and the inherent need for compactness while collapsing or storage of the top when not fully extended.

The accordion-type of camper top must utilize snaps or grommets to secure the lower edge of the covering to the frame of the truck. This in turn greatly increases the probability of an unwanted intruder being able to enter the back of the vehicle unattended either by unsnapping the assembly and entering or slitting the canvas and entering that way. For security purposes, the previous type of collapsible camper top has obvious limitations. A metal structure renders it much more difficult to enter, and in general, offers the owner of the vehicle a sense of security knowing that the camper is secure.

The present invention embodies all the features that are needed for useful recreational campers as well as that which is needed for the maximum use and efficiency of the cargo area of a truck.

SUMMARY OF THE INVENTION

This invention relates to a camper and in particular to a structure with a movable roof. The device comprises a shell, a longitudinally divided roof with a plurality of pivotal support arms secured to the outer, upper edge of the shell at one end and to the roof at the other end. Connected within the interior at one end to the front wall and to the rear panels are control members. The roof pivots outwardly from a first closed position to a second open position whereas the roof panels rest in a position proximate the side walls of the camper shell.

An object of this invention is to provide a rigid bodied convertible structure.

Another object of this invention is to provide a convertible structure whereas the camper roof is pivotal from a closed position to an open position.

A further object of this invention is to provide a convertible structure for a truck camper whereas the truck may serve as a recreational vehicle and as a traditional cargo hauling vehicle.

Yet another object of this invention is to provide a convertible structure whereas the structure being of a solid metal or wood construction is more secure against crime.

Yet a further object of this invention is to provide a convertible structure that is aesthetically appealing.

Still another object of this invention is to provide a convertible structure that is economical to manufacture.

Still a further object of this invention is to provide a convertible structure that in an open position, the roof does not occupy valuable cargo hauling space.

Yet another object of this invention is the provision of a convertible structure which is extremely rugged in construction, effective in use and simple and economical to manufacture.

These objects and other features and advantages become more readily apparent upon reference to the following description when taken in conjunction with the appended drawings.

In the drawings as hereinafter described, a preferred embodiment of the invention is illustrated, however, various modifications can be made thereto without departing from the true spirit and scope of the invention.

DESCRIPTION OF THE PREFERRED EMBODIMENT

Figure 1:
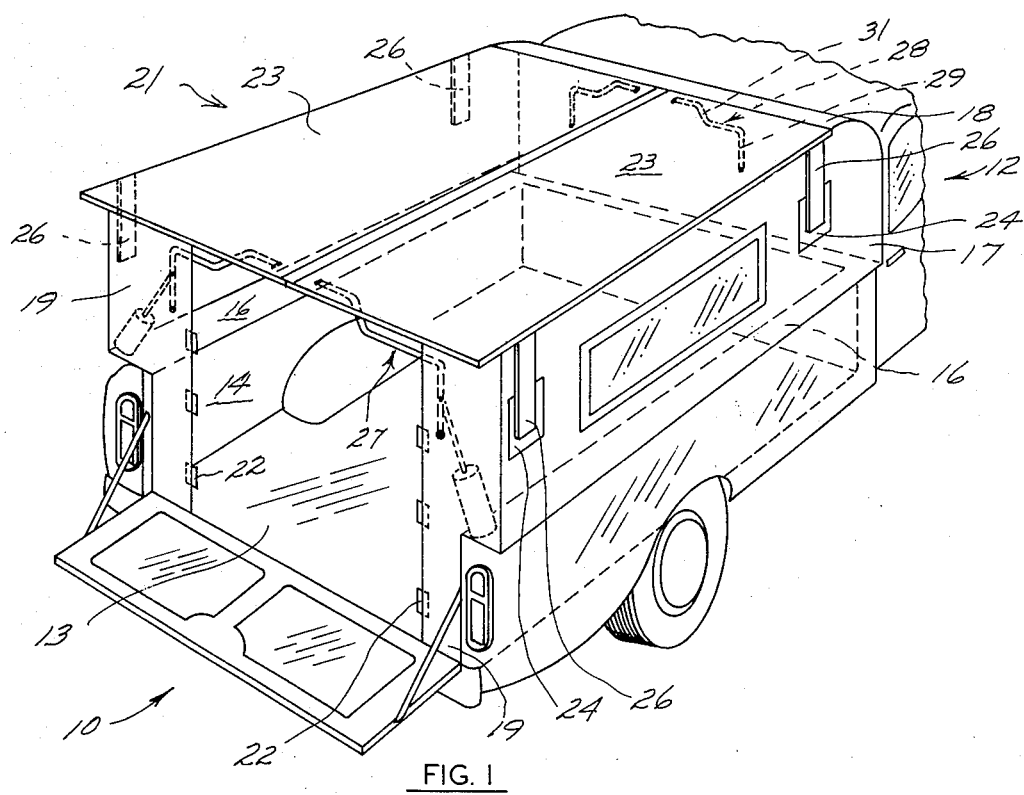
FIG. 1 is a perspective view of the convertible structure of this invention in a closed position.
Figure 2:
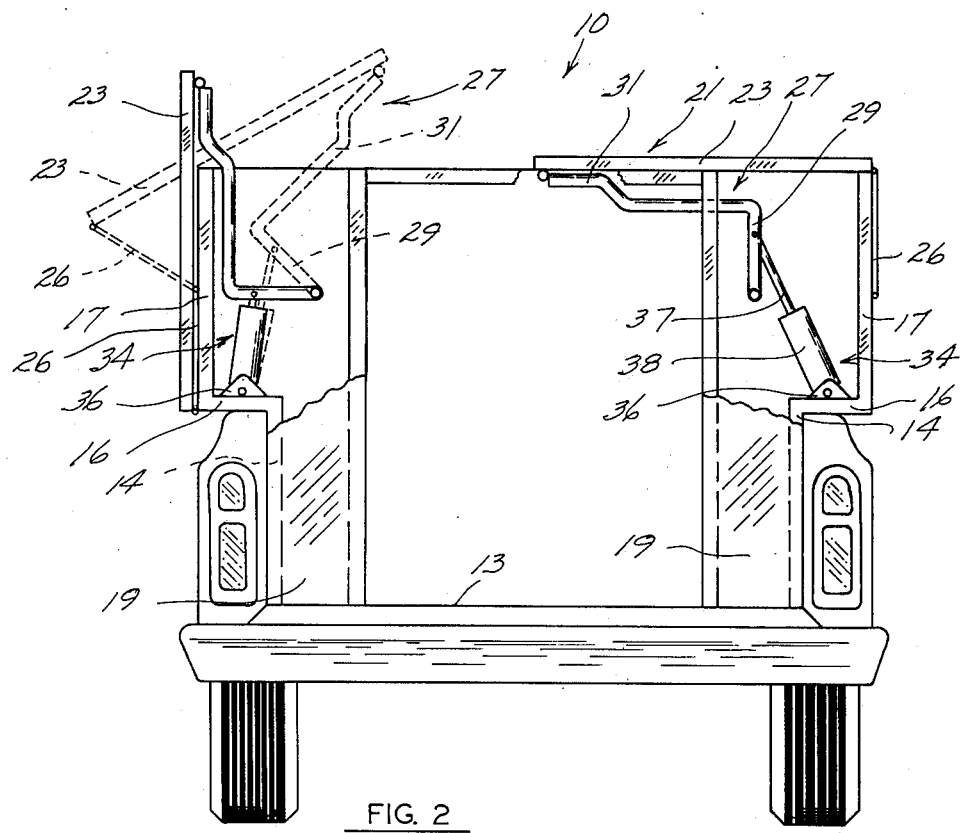
FIG. 2 is an end elevational view thereof.

Referring now to the drawings, the convertible structure of this invention is disclosed generally at 10 in FIGS. 1 and 2. The structure or camper, mounted on the bed 11 of a pickup truck 12 in a conventional manner, includes a floor 13 disposed on the bed of the truck; a pair of spaced lower side walls 14 secured at their lower edge to the outer longitudinal edges of the floor 13; a pair of spaced, aligned ledges 16 secured at their innter longitudinal edge to the upper edge of the lower side walls 14; a pair of spaced upper side walls 17 secured at their lower edges to the outer edge of the ledges 16; a front wall 18 secured at its side edges to the forward edges of the side walls 14 and 17 and the ledge 16 and at its bottom edge to the forward edge of the floor 13; a pair of spaced, aligned rear upstanding panels 19 secured on one edge to the rear edges of the side walls 14 and 17 and the ledge 16; and the roof assembly 21 movably disposed on the upper ends of the upper side walls 17.

The free vertical edges of the rear panels 19 project toward each other and each has a plurality of lift off type hinges 22 (FIG. 1) secured thereto. Hingedly connected to each set of hinges 22 is a rear door (not shown). The doors opening outwardly from the rear end of the camper 10 are held in a closed position by a standard lock mechanism (not shown), and in the closed position completely enclose the rear end of the camper 10.

The roof assembly 21 (FIGS. 1 and 2) includes a pair of elongated, horizontally disposed in a closed position, roof panels 23. As each roof panel 23 is attached to its respective side wall 17 in an identical manner, the attaching hardware of only one will be described with like numerals identifying like parts. The hardware includes a pair of spaced plates 24 secured to the upper side wall 17; a pair of spaced hinge elements 26, each hingedly secured on one end to a plate 24 and each hingedly secured on the other end to the longitudinal outer edge of a roof panel 23; and a pair of L-shaped control arms 27 and 28 interconnected between a rear panel and the roof panel and between the front wall and the roof panel respectively.

Figure 4:
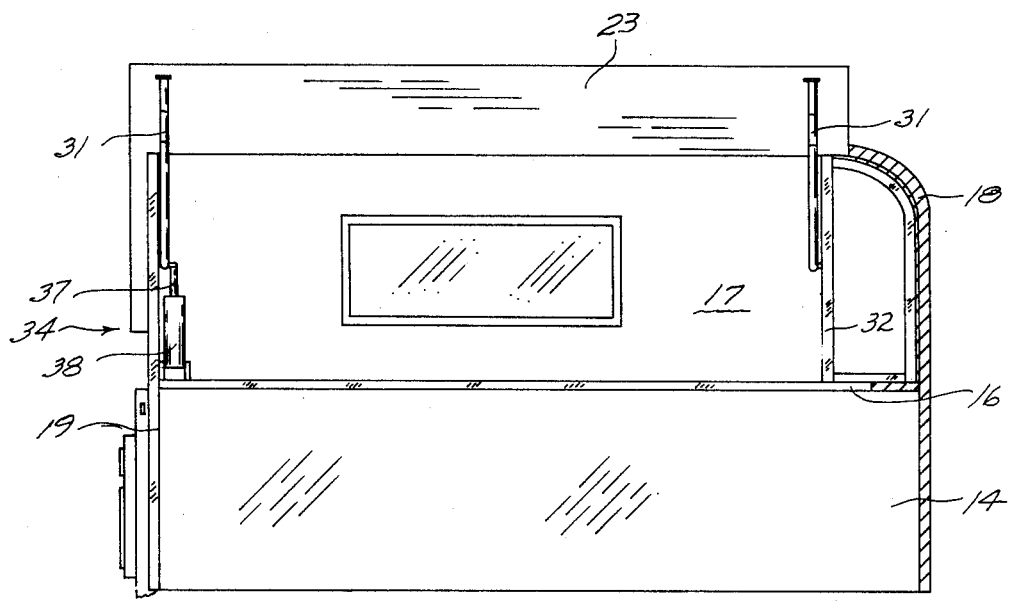
FIG. 4 is a side elevation of the camper.

Referring to FIGS. 2 and 4, the rear L-shaped control arm 27 is depicted as being pivotally secured on the free end of its base leg 29 to the rear panel 19 and on the free end of its other leg 31 to the roof panel 23 proximate its inner side of its inner longitudinal edge. The forward L-shaped control arm 28 is pivotally secured on the free end of its base leg 29 to a forward mounting assembly 32 and on the free end of the other leg 31 to the inner side of the inner longitudinal edge of the roof panel 23. The mounting assembly 32 is secured to the front wall 18.

A hydraulic jack 34 is pivotally mounted on its base end to a bracket 36 secured to the ledge 16 proximate the rear panel 19, and the free end of the piston rod 37, projecting from the cylinder 38 of the jack 34, is pivotally secured to the base leg 29 intermediate its ends.

Interconnecting the roof panels 23 in a seal assembly 39 (FIG. 2). Secured to the right roof panel 23, as observed from the rear end of the camper, is a modified T-shaped elongated member 41 having an inclined leg 42 and a horizontal leg 43. One side of the horizontal leg 43 is disposed on the top side of the roof panel 23, the inclined leg 42 is secured to the longitudinal inner edge of the roof panel 19, and the other side of the horizontal leg 43 projects over the left roof panel 23. Secured to the longitudinal inner edge of the left roof panel 23 is a modified L-shaped member 44 having a horizontal leg 46 which projects under the right roof panel and an inclined leg 47 which is secured to the inner edge of the left roof panel. In a closed position the inclined legs 42 and 47 are in juxtaposition, the horizontal legs 43 and 46 are parallel and any opening between the inner edges of the roof panels 23 are sealed by the members.

Figure 3:
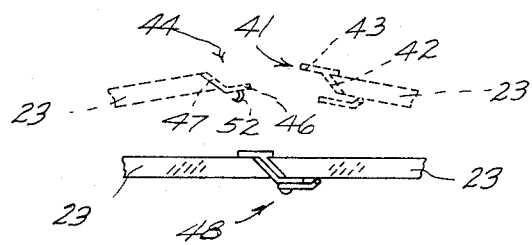
FIG. 3 is an end elevational view of the seal assembly.
Figure 5:
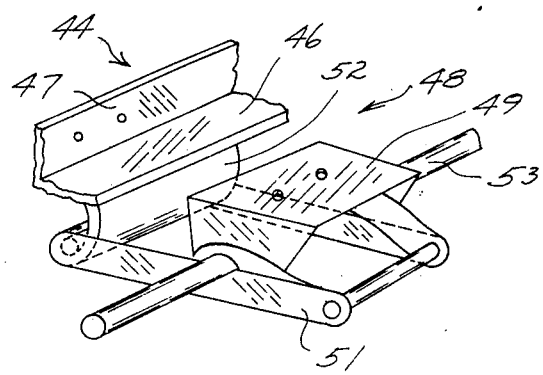
FIG. 5 is an enlarged perspective view of the latch mechanism.

The roof panels 23 are secured together in a closed position by a plurality of spaced locking assemblies 48 (FIGS. 3 and 5). Each assembly 48 includes a bracket 49 secured to the right roof panel proximate the T-shaped member 41, a spring biased, open centered link 51 pivotally secured to the bracket 49, and a hook element 52 secured to the left roof panel. A rod 53 interconnects each assembly 48 at its link 51. Upon actuation of the rod the hook element 52 and link 51 can either be locked together or unlocked to permit opening of the roof panels.

In operation, with the locking assemblies 48 unlocked, the roof panels can either be moved by the jacks or by hand from a closed position to an open position. As each roof panel 19 is raised the control arms 27 and 29 at the free end of the base leg 29 while the outside hinge elements 26 are pivoting at their one end. When fully opened to their open position, the roof panels are vertically disposed against the outer sides of the vertical walls 17, the hinge arms support and stabilize the panels 19 at their outer ends and the control arms support and stabilize the panels at their inner ends. The jacks if used can lock the control arms in an open position or a latching device can be used to lock the panels 19 in an open position. The plates 24 are utilized to bear the weight and stress created by the opening and closing of the roof panels and any forces created by the movement of the truck when the panels are in an open position.

In the closed position the convertible camper is used as an ordinary camper and in the open position it can be used to carry larger items which project above the upper edges of the vertical walls 17.

It will be noted that the other leg 31 of each control arm 27 or 28 has a bend formed therein which seats on the upper edge of the vertical wall 17 thus removing part of the weight from the hinge element 26 and the control arm 27 and 28.

I claim:

1. A convertible structure comprising:
   a floor;
   a pair of spaced upstanding side walls secured to said floor;
   a front end wall secured to said floor and to said side walls;
   a pair of spaced rear end walls, each said rear end wall secured to said floor and to one of said side walls;
   a pair of roof panels movable from a closed position to an open position, said roof panels extending between said side walls in longitudinal edge to longitudinal edge position over said floor when disposed in said closed position and each roof panel vertically disposed adjacent its respective side wall when in said open condition;
   hinge means hingedly interconnected between each said roof panel and its respective side wall; and
   L-shaped control arms, each control arm having a base leg connected on one end to one end of a second leg with the free end of said base leg pivotally connected to one of said end panels and with the free end of said second leg pivotally connected to one of said roof panels adjacent thereto, and said second leg having a bend formed therein which is operable to seat on the upper edge of said side wall when said roof panel is disposed in said open position.

2. A convertible structure as defined in claim 1 and including at least one plate secured to each of said side walls and having said hinge one end hingedly connected thereto.

3. A convertible structure as defined in claim 2 including a latch assembly secured to one of said roof panels and operatively connected to the other roof panel to lock said panels in said closed position.

4. A convertible structure as defined in claim 3 including a sealing assembly secured to said roof panels to seal the joint formed therebetween when said roof panels are in said closed position.

5. A convertible structure as defined in claim 2 and including at least one power means mounted in said structure and operably secured to one of said control arms, wherein actuation of said power means causes said control arm to pivot about said pivot connection to said rear end wall thus opening and closing said respective roof panel.

6. A convertible structure as defined in claim 5 including a latch assembly secured to one of said roof panels and operatively connected to the other roof panel to lock said panels in closed position.

7. A convertible structure as defined in claim 6 including a sealing assembly secured to said roof panels to seal the joint formed therebetween when said roof panels are in said closed position.

* * * * *